(12) United States Patent
Van Dyke et al.

(10) Patent No.: US 7,733,405 B2
(45) Date of Patent: Jun. 8, 2010

(54) APPARATUS AND METHOD FOR RESIZING AN IMAGE

(75) Inventors: Phil Van Dyke, Surrey (CA); Barinder Singh Rai, Surrey (CA)

(73) Assignee: Seiko Epson Corporation, Tokyo (JP)

( * ) Notice: Subject to any disclaimer, the term of this patent is extended or adjusted under 35 U.S.C. 154(b) by 909 days.

(21) Appl. No.: 11/055,479

(22) Filed: Feb. 10, 2005

(65) Prior Publication Data

US 2006/0176376 A1    Aug. 10, 2006

(51) Int. Cl.
H04N 5/222    (2006.01)
G09G 5/00    (2006.01)

(52) U.S. Cl. .......................... 348/333.11; 348/333.12; 345/660; 345/668; 345/670; 345/671

(58) Field of Classification Search ............... 348/222.1, 348/333.11, 333.12; 345/660, 668–671
See application file for complete search history.

(56) References Cited

U.S. PATENT DOCUMENTS

| | | | | |
|---|---|---|---|---|
| 5,241,653 | A * | 8/1993 | Collins et al. ................ | 345/668 |
| 5,874,937 | A * | 2/1999 | Kesatoshi .................... | 345/428 |
| 6,141,061 | A | 10/2000 | Takeuchi | |
| 6,392,711 | B1 | 5/2002 | Kesatoshi | |
| 6,456,745 | B1 * | 9/2002 | Bruton et al. ................ | 382/298 |
| 6,473,088 | B1 | 10/2002 | Matsumoto et al. | |
| 6,614,439 | B2 | 9/2003 | Matsumoto et al. | |
| 6,683,604 | B1 | 1/2004 | West et al. | |
| 6,724,948 | B1 | 4/2004 | Lippincott | |
| 6,982,729 | B1 * | 1/2006 | Lange et al. ................. | 345/660 |
| 7,057,658 | B1 * | 6/2006 | Shioji et al. ............. | 348/333.12 |
| 7,142,221 | B2 * | 11/2006 | Sakamaki et al. ........... | 345/592 |
| 7,307,669 | B2 * | 12/2007 | Bhatia et al. ................ | 348/581 |
| 2002/0039109 | A1 | 4/2002 | Mamiya et al. | |
| 2002/0154148 | A1 | 10/2002 | Inoue et al. | |
| 2002/0167465 | A1 * | 11/2002 | Okuno et al. ................. | 345/55 |
| 2003/0081225 | A1 | 5/2003 | Nakami et al. | |
| 2003/0132948 | A1 | 7/2003 | Bhogal et al. | |
| 2003/0234798 | A1 | 12/2003 | Ratnakar | |
| 2004/0001636 | A1 | 1/2004 | Miceli et al. | |
| 2004/0114812 | A1 | 6/2004 | Bhaskaran et al. | |
| 2004/0150653 | A1 * | 8/2004 | Sakamaki et al. ........... | 345/592 |
| 2004/0183948 | A1 | 9/2004 | Lai et al. | |
| 2005/0073600 | A1 * | 4/2005 | Sato ....................... | 348/333.01 |
| 2005/0174457 | A1 * | 8/2005 | Yoshino et al. ......... | 348/333.01 |
| 2006/0088228 | A1 * | 4/2006 | Marriott et al. ............. | 382/305 |
| 2006/0139379 | A1 * | 6/2006 | Toma et al. ................. | 345/698 |

* cited by examiner

*Primary Examiner*—Sinh Tran
*Assistant Examiner*—Christopher K Peterson

(57) ABSTRACT

A hardware implemented method for resizing an image is provided. In this method, the image is captured and a size of the image is calculated as the image is being received by a display controller. Thereafter, a scaling ratio is calculated based on the calculated size of the image and an output image size. The display controller then scales the image according to the calculated scaling ratio. A display controller and a resizer for resizing the image are also described.

19 Claims, 5 Drawing Sheets

Scaling disabled

Scaling enabled

Scaling enabled
Integer Scaling Ratio

Scaling enabled
Fractional Scaling Ratio

APPARATUS AND METHOD FOR RESIZING AN IMAGE

BACKGROUND OF THE INVENTION

1. Field of the Invention

This invention relates generally to computer graphics and, more particularly, to an apparatus and method for resizing an image.

2. Description of the Related Art

Display controllers used in small, portable devices typically include resizers that scale and/or crop an image from an image capture device to a desired size. For example, a complementary metal oxide semiconductor (CMOS) sensor inputs image frames to a camera interface of a liquid crystal display controller (LCDC) at specific horizontal and vertical dimensions. The camera interface then sends each camera frame to a resizer that resizes (i.e., scales and/or crops) the camera frame to a predetermined, desired size. Thereafter, the resizer outputs the resized image to a display panel for display.

However, a number of limitations and inconveniences exist with current display controllers. In particular, resizer input image dimensions, resizer scaling ratios, and resizer output sizes must be manually provided to the display controllers. Accordingly, the correct input image dimensions, scaling ratios, and output sizes must be accurate or the resizer will not properly resize the images. In other words, the above-defined variables must respectively match or the resizer will not properly resize the images. Providing the variables to the display controller is labor intensive and prone to errors because a user needs to manually calculate the variables. Furthermore, the display controller needs to write the variables received from central processing unit (CPU) to internal registers. The process of writing the variables utilizes valuable CPU bandwidth and the storage of variables requires extra memory (i.e., internal registers).

In view of the foregoing, there is a need to provide reliable apparatus and method for resizing images that are not labor intensive and utilize less CPU bandwidth and memory.

SUMMARY OF THE INVENTION

Broadly speaking, the present invention fills these needs by providing hardware implemented method and apparatus for resizing an image. It should be appreciated that the present invention can be implemented in numerous ways, including as a method, a system, or a device. Several inventive embodiments of the present invention are described below.

In accordance with a first aspect of the present invention, a hardware implemented method for resizing an image is provided. In this method, the image is captured and a size of the image is calculated as the image is received by a display controller. Thereafter, a scaling ratio is calculated based on the calculated size of the image and an output image size. The display controller then scales the image according to the calculated scaling ratio.

In accordance with a second aspect of the present invention, a resizer for resizing an image is provided. The resizer includes circuitry for receiving the image and circuitry for calculating a size of the image. Circuitry for retrieving an output image size from a register and circuitry for calculating a scaling ratio based on the calculated size and the output image size are also included. The resizer additionally includes circuitry for scaling the image according to the calculated scaling ratio.

In accordance with a third aspect of the present invention, a display controller for resizing an image is provided. The display controller includes an image capture device interface that includes circuitry for receiving the image from an image capture device, and counters for calculating a size of the image. Additionally included in display controller is a resizer that is in communication with the image capture device interface. The resizer includes circuitry for receiving the image and the size of the image from the image capture device interface, and circuitry for retrieving an output image size from a register. Further included in resizer is circuitry for cropping the image to the output image size.

Other aspects and advantages of the invention will become apparent from the following detailed description, taken in conjunction with the accompanying drawings, illustrating by way of example the principles of the invention.

BRIEF DESCRIPTION OF THE DRAWINGS

The present invention will be readily understood by the following detailed description in conjunction with the accompanying drawings, and like reference numerals designate like structural elements.

DETAILED DESCRIPTION

An invention is described for apparatus and hardware implemented method for resizing an image. It will be obvious, however, to one skilled in the art, that the present invention may be practiced without some or all of these specific details. In other instances, well known process operations have not been described in detail in order not to unnecessarily obscure the present invention.

The embodiments described herein provide hardware implemented method, apparatus, display controller, and resizer for resizing an image captured by an image capture device. Essentially, a size of the image is automatically calculated. As will be explained in more detail below, in one embodiment, counters may be used to calculate the size of the image. A scaling ratio may then be calculated based on the calculated size of the image and a preprogrammed, output image size. The resizer uses the calculated scaling ratio and the calculated image size to resize the image by cropping and/or by scaling the image.

Figure 1:
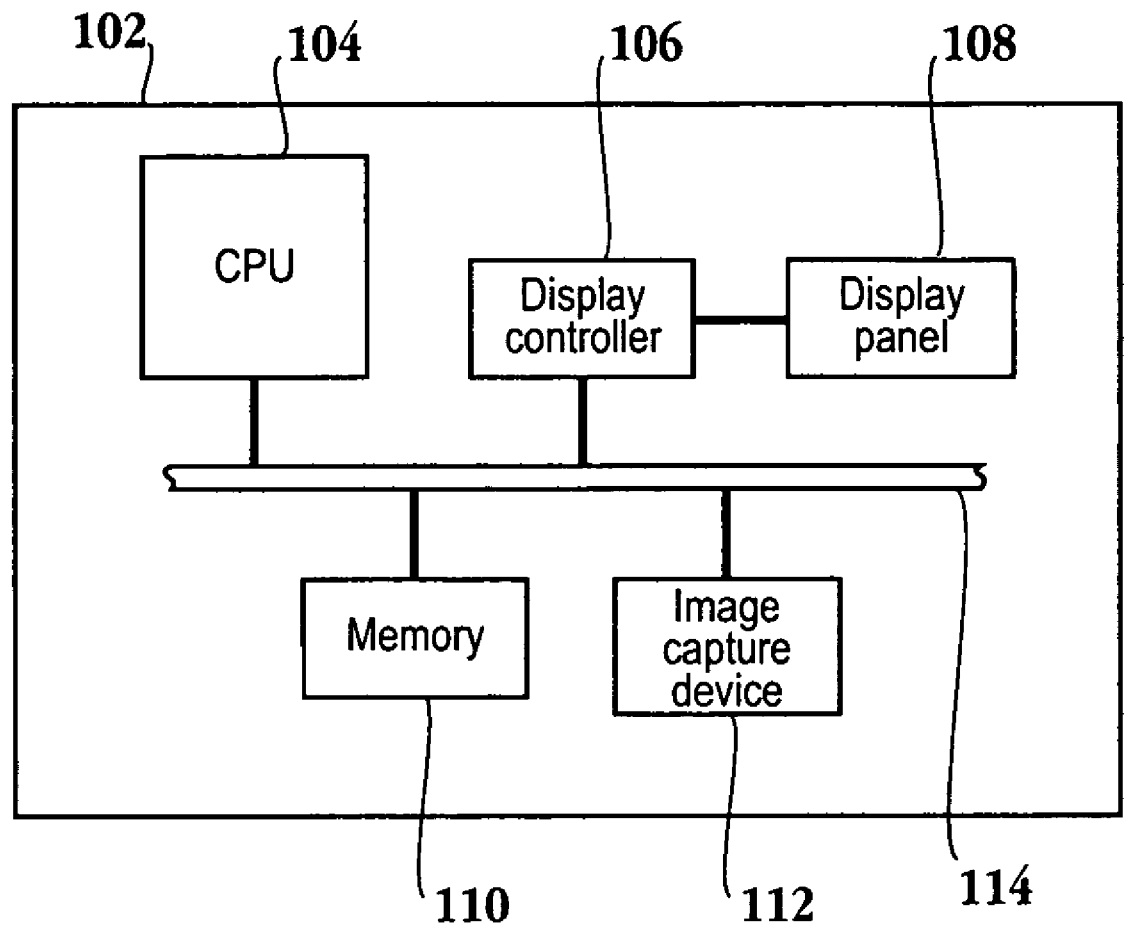
FIG. 1 is a simplified schematic diagram of an apparatus for resizing an image, in accordance with one embodiment of the present invention.

FIG. 1 is a simplified schematic diagram of an apparatus for resizing an image, in accordance with one embodiment of the present invention. Apparatus 102 includes any suitable type of computing device. For example, apparatus 102 may be a personal digital assistant, a cell phone, a web tablet, a pocket personal computer, a portable electronic computing device, etc. As shown in FIG. 1, apparatus 102 includes central processing unit (CPU) 104, memory 110, display controller 106, display panel 108, and image capture device 112.

Display controller 106 is in communication with CPU 104, memory 110, display panel 108, and image capture device 112. One skilled in the art will appreciate that CPU 104, memory 110, display controller 106, and image capture device 112 may be in communication through common bus 114.

Image capture device 112 records photographic images as image data and outputs the raw image data to display controller 106. For example, image capture device 112 may include a charge-coupled device (CCD) to capture the image. The CCD is a light-sensitive integrated circuit that stores and displays data for an image in such a way that each pixel in the image is converted into an electrical charge the intensity of which is related to a monochrome color. Of course, a complementary metal-oxide semiconductor (CMOS) chip, a widely used type of semiconductor, may be additionally utilized instead of a CCD.

Memory 110 includes, any suitable memory types, such as static access memory (SRAM), dynamic random access memory (DRAM), etc. In one embodiment, as will be explained in more detail below, a calculated scaling ratio and a calculated image size may be stored in registers within display controller 106. In another embodiment, memory 110, which is external to display controller 106, is configured to store the calculated scaling ratio and calculated image size. Additionally, display panel 108 may include random access memory (RAM) integrated display panels, liquid crystal displays (LCD), thin-film transistor (TFT) displays, cathode ray tube (CRT) monitors, televisions, etc.

Figure 2:
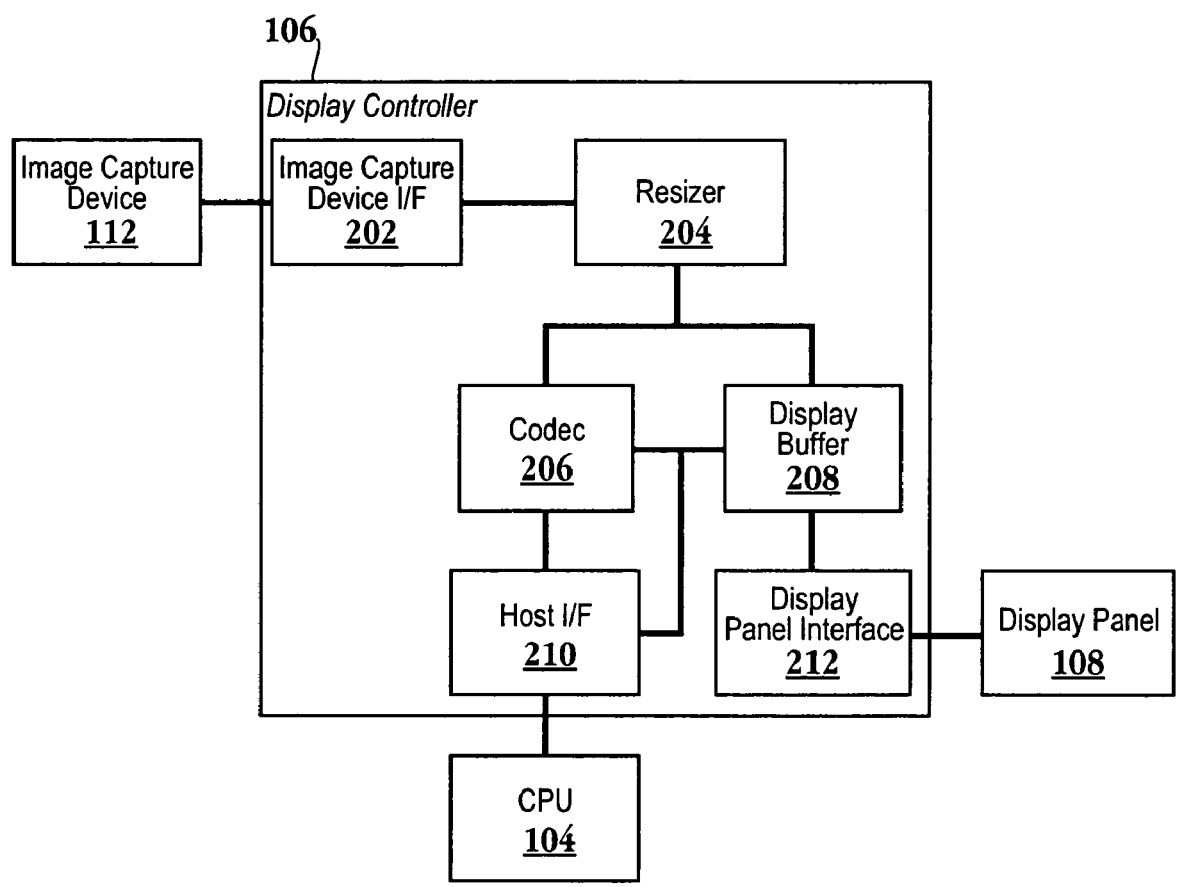
FIG. 2 is a detailed schematic diagram of the display controller shown in FIG. 1, in accordance with one embodiment of the present invention.

FIG. 2 is a detailed schematic diagram of the display controller shown in FIG. 1, in accordance with one embodiment of the present invention. Exemplary display controller 106 includes a liquid crystal display controller (LCDC), mobile graphics controllers, etc. As shown in FIG. 2, display controller 106 includes image capture device interface 202, resizer 204, compressor/decompressor (codec) 206, host interface 210, display buffer 208, and display panel interface 212. Image capture device interface 202 first sends the raw image received from image capture device 112 to resizer 204. In general, resizer 204 resizes the raw image to the appropriate size of the display panel. For example, image capture device 112 may capture images in 640×640 pixel resolution. In contrast, display panel 108 may have a 160×160 pixel resolution. To fit the image within display panel 108, resizer 204 shrinks the 640×640 pixel image received from image capture device 112 to a 160×160 pixel resolution.

In one embodiment, resizer 204 includes circuitry for calculating a size of the image received from image capture device 112 and circuitry for calculating a scaling ratio based on the calculated size and an output image size. Specifically, resizer 204 first receives the image from image capture device interface 202. In one embodiment, resizer 204 then calculates the size of the image by counting the number of pixels in a line of the image and counting a number of lines in a frame of the image. The size of the image is the number of pixels in a line multiplied by the number of lines in a frame.

It should be appreciated that horizontal, vertical, and data synchronization signals are encoded in video image signals. Horizontal synchronization signals indicate the start of a line, vertical synchronization signals indicate the start of a frame, and data synchronization signals indicate valid pixel data. In one embodiment, to count the number of pixels in a line, resizer 204 may include one or more counters to count the number of data synchronization signals between two horizontal synchronization signals. To count the number of lines in the frame, resizer 204 includes additional counters to count the number of horizontal synchronization signals between two vertical synchronization signals. In one embodiment, resizer 204 includes two counters, whereby one counter counts the horizontal synchronization signals and the second counter counts the data synchronization signals. However, it should be appreciated that resizer 204 may include more than two counters to track the horizontal and data synchronization signals. After the size of the image is calculated, the calculated size of the image may then be temporarily stored in a register for subsequent access.

In another embodiment, the size of the image may additionally be fed into resizer 204. Instead of calculating the size of the image in resizer 204, image capture device interface 202 may include the circuitry to calculate the size of the image. Here, image capture device interface 202 may also include counters to track the horizontal, vertical, and/or data synchronization signals. After the size of the image is calculated, image capture device interface 202 can output the size of the image to resizer 204.

After the size of the image from image capture device 112 is calculated, resizer 204 retrieves an output image size from a register within display controller 106. The output image size may be any suitable size and, in one example, the output image size is the viewable area of display panel 108. For liquid crystal display (LCD) panels, exemplary output image sizes include 176×220 pixels, 132×176 pixels, 320×240 pixels, etc. Since display panel 108 is typically hardwired to the computing device, the output image size is known and does not need to be computed. Accordingly, in one embodiment, display panel size is preprogrammed into the register. In another example, the output image size is a picture-in-picture (PIP) window size. PIP window is a sub-window where video is displayed within a main window, and the PIP window size may also be preprogrammed into a register. Thus, in one embodiment, display controller 106 may include two output image sizes stored in two registers, whereby one register stores the viewable area of display panel 108 and a second register stores the size of the PIP window to be displayed within the viewable area of the display panel.

With the calculated image size and the output image size, resizer 204 may crop and/or scale the image. In one embodiment, a scaling bit stored in a register specifies whether the image is to be cropped or scaled. For example, the scaling bit may have a bit value of one (i.e., a logical high value) to enable scaling or a bit value of zero (i.e., a logical low value) to disable scaling. Alternatively, the scaling bit may have a bit value of zero to enable scaling or a bit value of one to disable scaling. As will be explained in more detail below, if the scaling bit is enabled, resizer 204 scales the image according to the calculated scaling ratio. If the scaling bit is disabled, resizer 204 crops the image to the output image size.

Still referring to FIG. 2, after resizer 204 resizes (i.e., crops and/or scales) the image, the resizer outputs the resized image to codec 206 for compression and/or display buffer 208 for output to display panel 108. If the image is compressed, codec 206 receives the resized image from resizer 204 and compresses the resized image. Codec 206 then outputs the compressed, resized image to a host, such as CPU 104, through host interface 210. One skilled in the art will appreciate that codec 206 includes any suitable type of codec that compresses/decompresses data. Exemplary codec schemes include a Joint Photographic Experts Group (JPEG) codec, a Graphic Interchange Format (GIF) codec, a Portable Network Graphics (PNG) codec, etc. On the other hand, if the image is outputted to display panel 108, resizer 204 outputs the resized image to display buffer 208, which is configured to store the resized image. Display panel interface 212 retrieves the resized image from display buffer 208 and outputs the resized image to display panel 108 for display.

Figure 3:
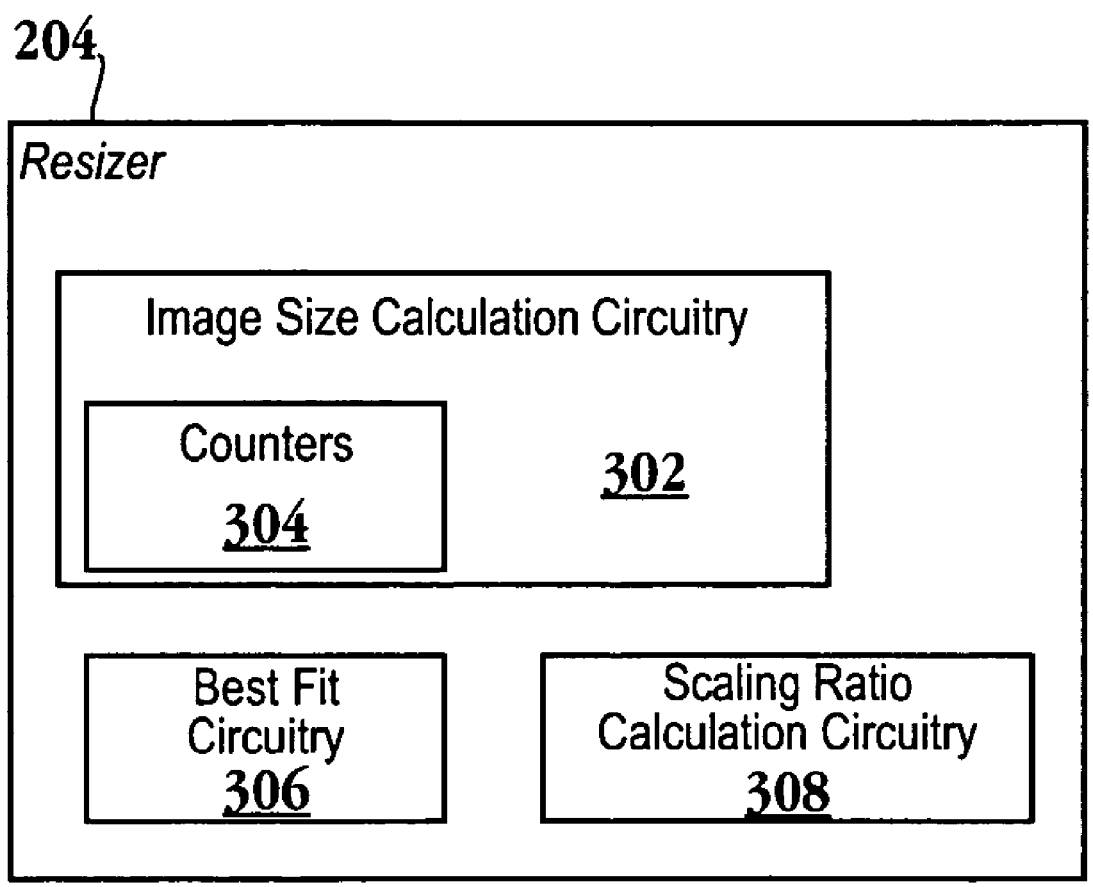
FIG. 3 is a simplified block diagram of a resizer for resizing an image, in accordance with one embodiment of the present invention.

FIG. 3 is a simplified block diagram of a resizer for resizing an image, in accordance with one embodiment of the present invention. As shown in FIG. 3, resizer 204 may include image size calculation circuitry 302, scaling ratio calculation circuitry 308, and best fit circuitry 306. As discussed above, in one embodiment, image size calculation circuitry 302 may include two or more counters to track the number of horizontal and data synchronization signals. Scaling ratio calculation circuitry 308 calculates the scaling ratio based on the calculated image size and the output image size. For example, in one embodiment, the scaling ratio is calculated by dividing the output image size by the calculated image size. As will be explained in more detail below, the scaling ratio may be an integer or a fraction. If the scaling ratio is an integer, resizer 204 may include best fit circuitry 306. Best fit circuitry 306 determines a best fit for scaling the image. For example, as will be explained in more detail below, best fit circuitry 306 calculates a scaling ratio for the image that maximizes a display area of the image.

Figure 4:
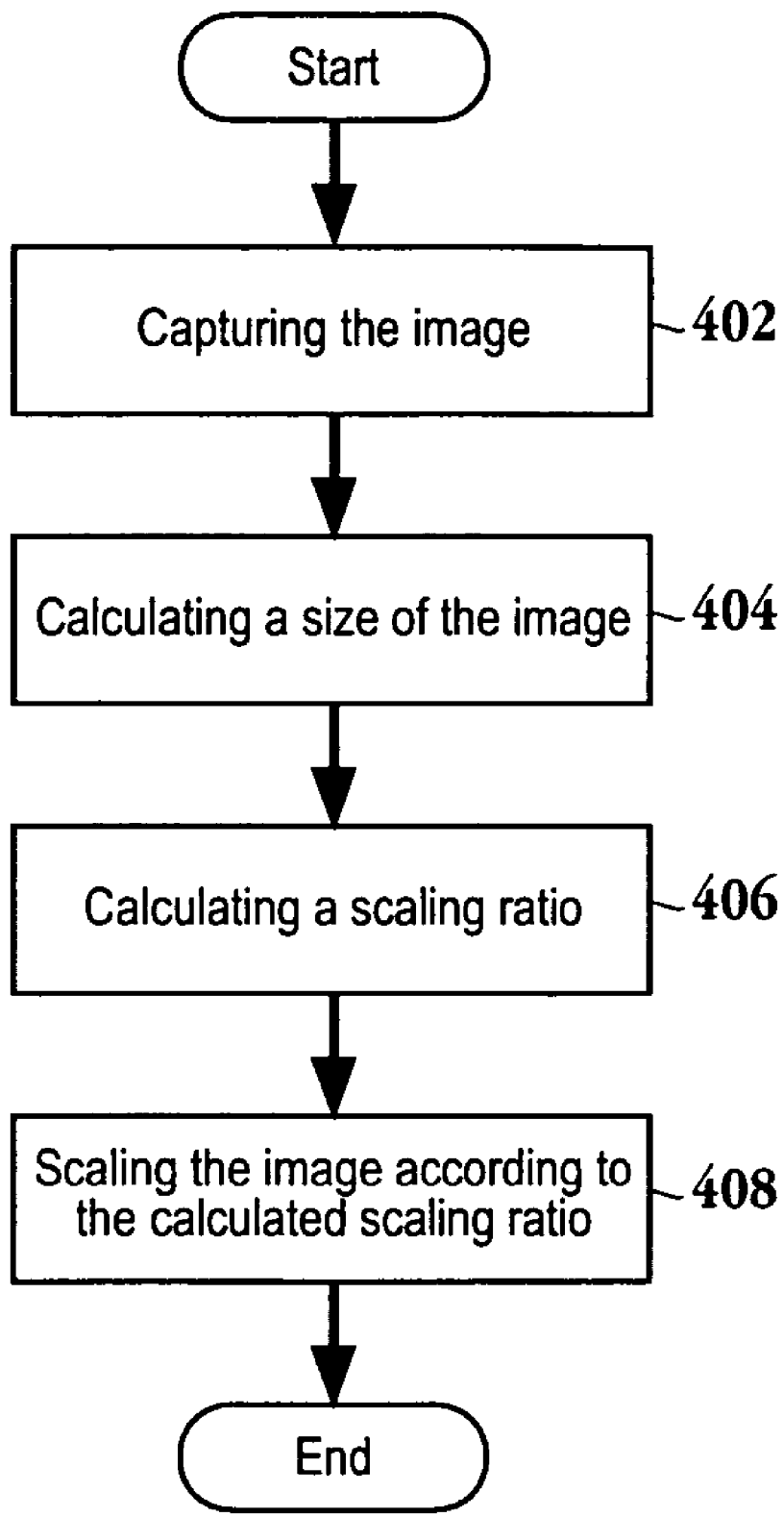
FIG. 4 is a high level flowchart illustrating the method operations for resizing an image, in accordance with one embodiment of the present invention.

FIG. 4 is a high level flowchart illustrating the method operations for resizing an image, in accordance with one embodiment of the present invention. An image is first captured in operation 402. Thereafter, the size of the image is calculated as the image is received by the display controller in operation 404. As discussed above, in one embodiment, an image capture device interface may calculate the size of the image and output the calculated image size to the resizer. In another embodiment, the resizer calculates the size of the image. The size of the image may be calculated by using two or more counters to track the horizontal and data synchronization signals.

With the size of the image calculated and scaling enabled, the scaling ratio may then be calculated in operation 406 based on the calculated image size and the output image size, in accordance with one embodiment of the present invention. Thereafter, the image is scaled according to the calculated scaling ratio in operation 408. On the other hand, if scaling is disabled, the scaling ratio does not need to be calculated. In this embodiment, instead of scaling the image, the image is cropped to the output image size. It will be apparent to one skilled in the art that the functionality described herein may be synthesized into firmware through a suitable hardware description language (HDL). For example, the HDL, e.g., VERILOG, may be employed to synthesize the firmware and the layout of the logic gates for providing the necessary functionality described herein to provide a hardware implementation of the resizing techniques and associated functionalities.

Figure 5A:
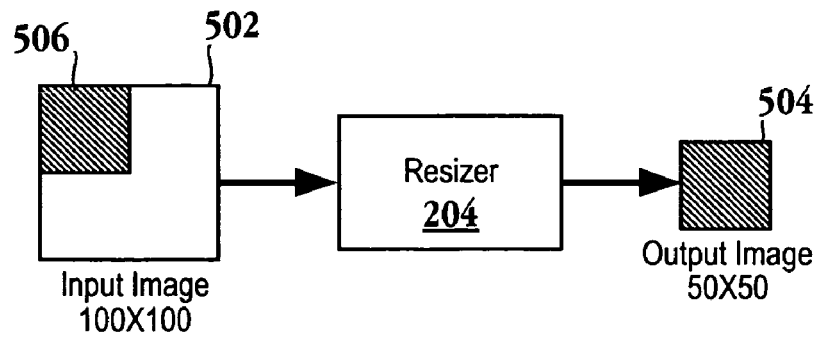
FIGS. 5A, 5B, 5C, and 5D are diagrams that illustrate the various embodiments of cropping and/or scaling an image.

FIGS. 5A, 5B, 5C, and 5D are diagrams that illustrate the various embodiments of cropping and/or scaling an image. As discussed above, after the size of the image is calculated, a scaling ratio may be calculated depending on whether scaling is disabled or enabled. If scaling is disabled, the image received from the image capture device is cropped. For instance, as shown in FIG. 5A, resizer 204 receives input image 502 captured from image capture device and resizes the input image to produce output image 504. The size of input image 502 is calculated to be 100×100 pixels and the preprogrammed, output image size is 50×50 pixels. With scaling disabled, resizer 204 resizes input image 502 by cropping any 50×50 display area 506 from the input image to produce output image 504.

Figure 5B:
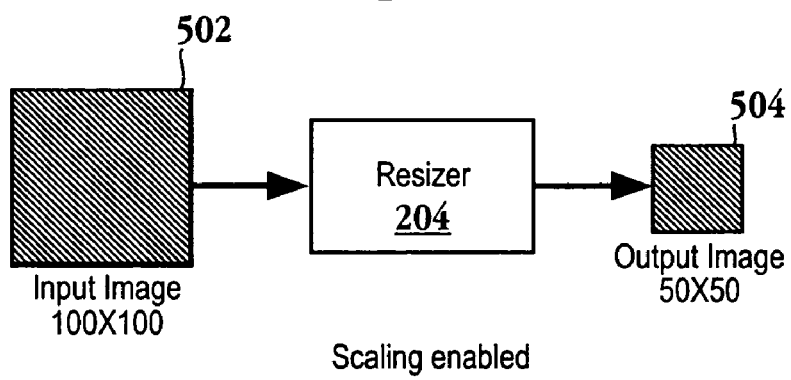

On the other hand, if scaling is enabled, resizer 204 calculates a scaling ratio and scales the image according to the calculated scaling ratio. For example, as shown in FIG. 5B, resizer 204 receives input image 502 captured from image capture device and resizes the input image to produce output image 504. Again, the size of input image 502 is calculated to be 100×100 pixels and the preprogrammed, output image size is 50×50 pixels. With scaling enabled, resizer 204 calculates a scaling ratio based on the calculated image size and the output image size. In this example, the calculated scaling ratio is 2:1 and, as such, resizer 204 scales the entire 100×100 input image 502 to the output image size of 50×50 pixels.

Figure 5C:
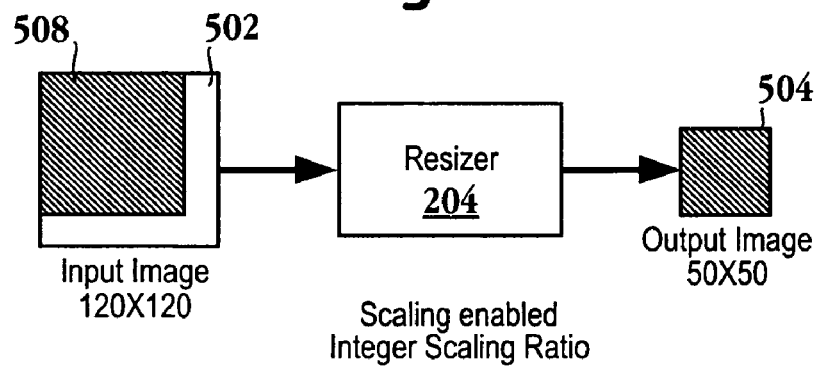

Depending on the hardware used by the display controller, resizer 204 can scale the image by fractional ratios or integer ratios. Display controllers typically utilize integer scaling because integer calculations are much faster than fractional calculations. FIG. 5C illustrates an exemplary integer scaling technique. As shown in FIG. 5C, resizer 204 receives input image 502 captured from image capture device and resizes the input image to produce output image 504. In this embodiment, the size of input image 502 is calculated to be 120×120 pixels and the preprogrammed, output image size is 50×50 pixels. Since scaling is enabled, resizer 204 calculates a scaling ratio based on the calculated image size and the output image size. Here, the calculated image size of 120×120 pixels and the output image size of 50×50 pixels yield a 2.4:1 integer scaling ratio. However, in this embodiment, display controller calculates in integers and cannot process fractional scaling ratios. Accordingly, resizer 204 may round off 2.4 to the closest integer number of 2. With a scaling ratio of 2:1, resizer 204 first crops the 120×120 input image 502 into a 100×100 display area 508 because, as discussed above, scaling the 100×100 display area to the output image size of 50×50 pixels yields a 2:1 scaling ratio. Resizer 204 then scales 100×100 display area 508 to the output image size of 50×50 pixels. As a result, output image 504 is a cropped and scaled version of input image 502.

As shown in FIG. 5C, since output image 504 is a cropped and scaled version of input image 502, the input image may not be maximized and not optimally fit within output image 504. For example, instead of first cropping 120×120 input image 502 into a 100×100 display area 508, resizer 204 may instead first crop the display area to 50×50 pixels. Display area 508 of 50×50 pixels is not optimally maximized within input image 502 because a larger display area, such as 100×100, may be displayed while maintaining an integer scaling ratio. Accordingly, in one embodiment, resizer 204 may include best fit circuitry that calculates a scaling ratio for input image 502 that maximizes display area 508 of the input image within output image 504.

Figure 5D:
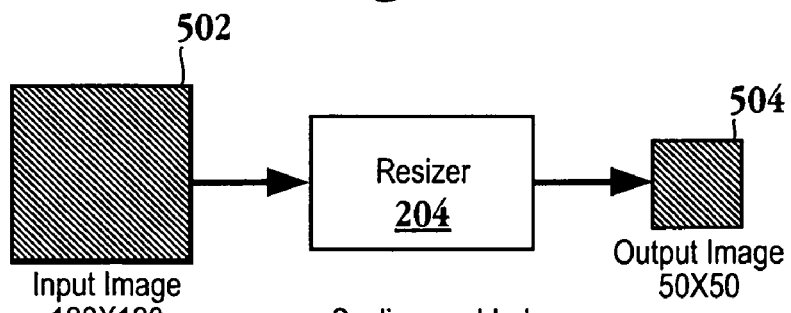

With fractional scaling enabled, complete input image 502 may be scaled to fit within size of output image 504. For example, FIG. 5D illustrates an exemplary fractional scaling technique. As shown in FIG. 5D, resizer 204 receives input image 502 captured from image capture device and resizes the input image to produce output image 504. In this embodiment, the size of input image 502 is calculated to be 120×120 pixels and the preprogrammed, output image size is 50×50 pixels. Since scaling is enabled, resizer 204 calculates a scaling ratio based on the calculated image size and the output image size. As discussed above, the calculated image size of 120×120 pixels and the output image size of 50×50 pixels yield a fractional 2.4:1 scaling ratio. With integer scaling, as shown in FIG. 5C, resizer 204 needs to crop and scale 120×120 input image 502 to produce output image 504. However, with fractional scaling, FIG. 5D shows that complete display area of input image 502 may be scaled by resizer 204 to produce 50×50 output image 504. In other words, with fractional scaling, the entire display area is visible in output image 504 and, essentially, the output image is a scaled version of the complete 120×120 input image 502.

In summary, the above described invention provides hardware implemented method, apparatus, display controller, and resizer for resizing an image. When compared to the conventional display controller that requires resizer input image dimensions, resizer scaling ratios, and resizer output sizes to be manually provided, automatically calculating the image size and the scaling ratio reduce resizing errors because a user does not need to manually calculate the above-defined variables. Furthermore, display controllers do not need extra memory to store each of the provided values. For example, with a 1024×1024 image, each value requires ten bits of memory storage. Thus, the memory requirements of the above described invention is merely ten bits for storing the output image size when compared to the conventional display controller that requires at least thirty bits to store the resizer input image dimensions, resizer scaling ratios, and resizer output sizes. In addition, calculating the variables in the display controller instead of providing the variables to the display controller via the CPU saves CPU bandwidth.

With the above embodiments in mind, it should be understood that the invention may employ various computer-implemented operations involving data stored in computer systems. These operations are those requiring physical manipulation of physical quantities. Usually, though not necessarily, these quantities take the form of electrical or magnetic signals capable of being stored, transferred, combined, compared, and otherwise manipulated. Further, the manipulations performed are often referred to in terms, such as producing, identifying, determining, or comparing.

Any of the operations described herein that form part of the invention are useful machine operations. The invention also relates to a device or an apparatus for performing these operations. The apparatus may be specially constructed for the required purposes, or it may be a general purpose computer selectively activated or configured by a computer program stored in the computer. In particular, various general purpose machines may be used with computer programs written in accordance with the teachings herein, or it may be more convenient to construct a more specialized apparatus to perform the required operations.

The above described invention may be practiced with other computer system configurations including hand-held devices, microprocessor systems, microprocessor-based or programmable consumer electronics, minicomputers, mainframe computers and the like. Although the foregoing invention has been described in some detail for purposes of clarity of understanding, it will be apparent that certain changes and modifications may be practiced within the scope of the appended claims. Accordingly, the present embodiments are to be considered as illustrative and not restrictive, and the invention is not to be limited to the details given herein, but may be modified within the scope and equivalents of the appended claims. In the claims, elements and/or steps do not imply any particular order of operation, unless explicitly stated in the claims.

The invention claimed is:

1. A hardware implemented method for resizing an image, comprising method operations of:
   capturing the image;
   calculating a size of the image as the image is being received by a display controller;
   calculating a scaling ratio based on the calculated size of the image and an output image size;
   determining if a stored scaling bit is disabled, wherein the stored scaling bit specifies if the image is to be cropped; and
   cropping the image to the output image size, if the stored scaling bit is disabled or scaling the image according to the calculated scaling ratio if the stored scaling bit is enabled; and
   if the scaling ratio is a non-integer, determining a best fit for scaling the image, wherein determining the best fit includes,
      rounding the non-integer scaling ratio to an integer scaling ratio;
      cropping the input image to a scaling size that is based on the integer scaling ratio; and
      scaling the cropped input image using the integer scaling ratio to generate the output image.

2. The hardware implemented method of claim 1, wherein the method operation of calculating the size of the image includes,
   counting a number of pixels in a line of the image; and
   counting a number of lines in a frame of the image.

3. The hardware implemented method of claim 2, wherein the method operation of counting the number of pixels in the line includes,
   counting a number of data synchronization signals between two horizontal synchronization signals.

4. The hardware implemented method of claim 2, wherein the method operation of counting the number of lines in the frame includes,
   counting a number of horizontal synchronization signals between two vertical synchronization signals.

5. The hardware implemented method of claim 1, wherein the scaling ratio is defined by one of an integer or a fraction.

6. The hardware implemented method of claim 1, wherein the size of the image and the scaling ratio are calculated in the display controller.

7. The hardware implemented method of claim 1, wherein the scaling size is larger than a size of the output image and maximizes display area of the input image within the output image.

8. A resizer for resizing an image, comprising:
   circuitry for receiving the image;
   circuitry for calculating a size of the image;
   circuitry for retrieving an output image size from a first register;
   circuitry for calculating a scaling ratio based on the calculated size and the output image size; and
   circuitry for scaling the image according to the calculated scaling ratio if a stored scaling bit is enabled, wherein the stored scaling bit specifies if the image is to be cropped; and
   circuitry for cropping the image to the output image size if the stored scaling bit is disabled; and
   circuitry for rounding a non-integer scaling ratio to an integer scaling ratio, wherein the cropping circuitry crops the input image before scaling the input image to a scaling size, the scaling size using the integer scaling ratio, the scaling size being larger than a size of the output image and maximizing a display area of the input image within the output image.

9. The resizer of claim 8, wherein the circuitry for calculating the size of the image includes at least two counters.

10. The resizer of claim 9, wherein one of the counters is configured to count a number of pixels in a line of the image.

11. The resizer of claim 9, wherein one of the counters is configured to count a number of lines in a frame of the image.

12. The resizer of claim 8, further comprising:
circuitry for storing the calculated size of the image in a second register.

13. A display controller for resizing an image, comprising:
an image capture device interface that includes,
circuitry for receiving the image from an image capture device, and
counters for calculating a size of the image; and
a resizer in communication with the image capture device interface, the resizer including;
circuitry for receiving the image and the size of the image from the image capture device interface;
circuitry for retrieving an output image size from a register;
circuitry for cropping the image to the output image size when a stored scaling bit is disabled; and
circuitry for scaling the image to the output image size when the stored scaling bit is enabled; and
circuitry for rounding a non-integer scaling ratio to an integer scaling ratio, wherein the cropping circuitry crops the input image before circuitry for scaling the image scales the input image using the integer scaling ratio.

14. The display controller of claim 13, wherein the resizer includes,
counters for calculating the size of the image.

15. The display controller of claim 13, wherein the resizer includes,
circuitry for calculating a scaling ratio based on the calculated size of the image and the output image size.

16. The display controller of claim 13, wherein the resizer includes,
circuitry for determining a best fit for scaling the image.

17. The display controller of claim 13, further comprising:
a display buffer in communication with the resizer, the display buffer being configured to store the cropped image received from the resizer.

18. The display controller of claim 13, further comprising:
a display panel interface in communication with the display buffer, the display panel interface being configured to output the cropped image for display.

19. The display controller of claim 13, wherein the display controller is incorporated into a portable electronic computing device.

* * * * *